Figure 1:
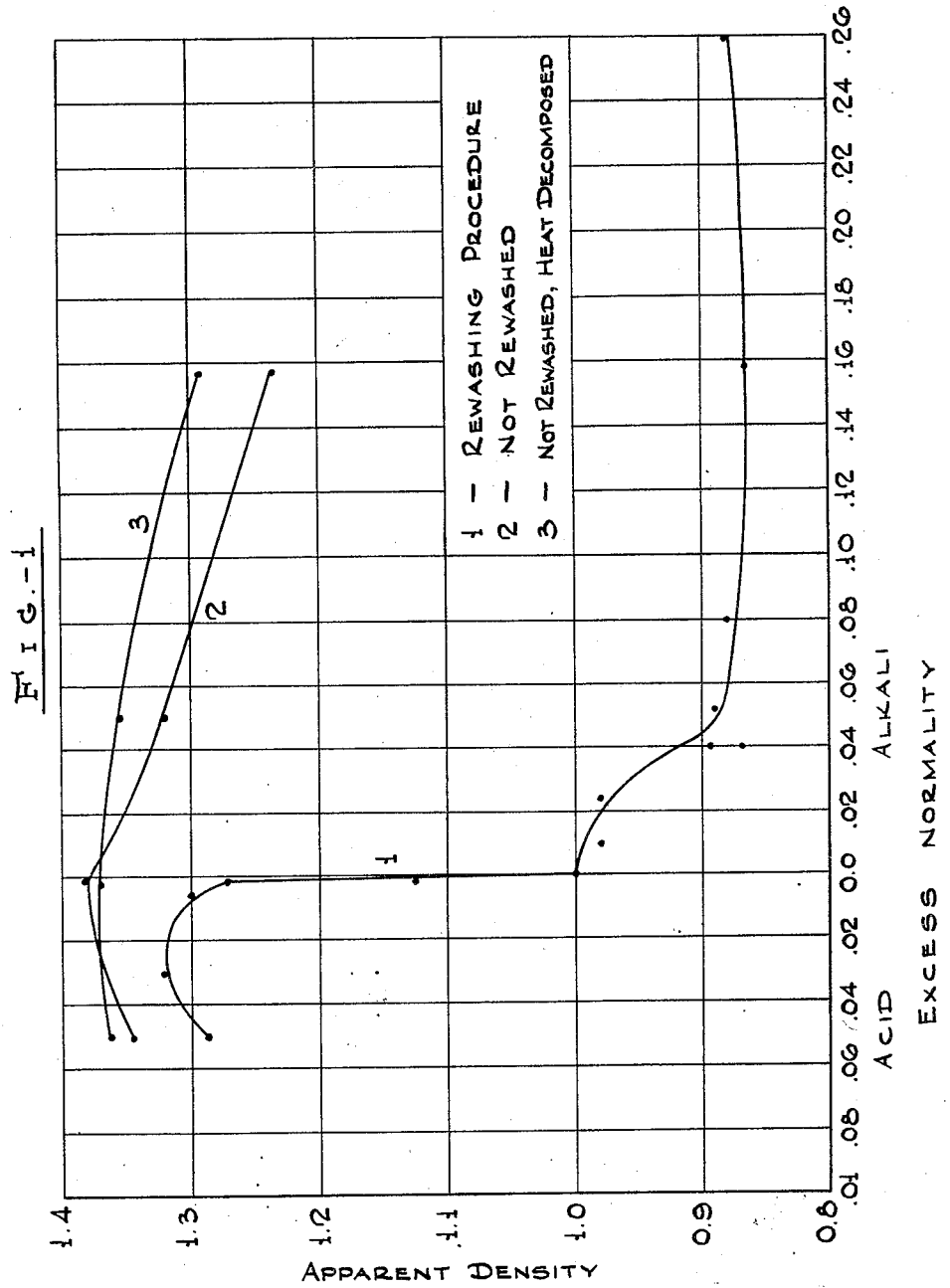

Patented May 15, 1951

2,553,402

UNITED STATES PATENT OFFICE 2,553,402

TITANIA GELS AND METHOD FOR THEIR MANUFACTURE

Gerald C. Connolly, Elizabeth, N. J., and Robert E. Schexnailder, Jr., Hope Villa, La., assignors to Standard Oil Development Company, a corporation of Delaware Application April 2, 1947, Serial No. 738,952

7 Claims. (Cl. 23—202)

The present invention relates to improvements in the preparation of catalysts, catalyst carriers and adsorbent gels. More particularly, the present invention relates to a method of preparing titania gels of varying apparent densities in a high state of purity.

In the preparation of gels for use as adsorbents, catalysts and catalyst carriers, it is very essential to observe certain definite precautions in order to obtain a product of the desired structure since materials of essentially the same chemical compositions may vary widely in their physical properties. For example, if the ingredients are not taken in the proper proportions and concentrations or if the alkalinity or acidity of the solution is not accurately controlled, a very inferior product is often obtained in place of the desired gel. Even after the desired jelly structure has been obtained it can be destroyed by improper handling. Materials with a gel structure are nearly always much more effective as adsorbents, catalysts and catalyst carriers than are non-gel-like products so it is highly important to obtain this desired structure in preparing these products. Even materials possessing a gel structure and having the same chemical composition may vary widely in their adsorbent and catalytic properties.

It is known to those familiar with adsorbents and adsorptive catalysts that their efficiencies depend largely on their porosity for in the state of high porosity the adsorptive materials present a greater surface for a given weight of the material to a liquid or gas which it adsorbs or which it contacts in a reaction zone which it catalyzes. The pores or capillaries in these adsorbent materials are exceedingly fine, that is, ultra-microscopic, and have a diameter less than the wave length of visible light. However, the art has developed methods of measuring and controlling the adsorptive power of such materials. As is well known in the art, a wide pore structure in gels is reflected in a relatively low apparent density of the material whereas a fine pore structure is associated with a high apparent density. Since the apparent density may be much more readily determined than the adsorptive capacity, it is ordinarily used in control work as a measure of the adsorptive characteristics or pore size of the gel. The term "apparent density" as used herein denotes the weight in grams of one cubic centimeter of the material made up of particles of a specified size. In discussing the gels of the present invention, the apparent density referred to will be that which is important in connection with the use of the gel in operations involving its being heated to a temperature of about 1000° F. To this end, the apparent density will refer to the apparent density of the gel having a particle size of from 4 to 12 mesh which has been heated for 3 hours at 1000° F.

Gels of a wide pore structure are usually preferred for general adsorbent purposes such as refining or decolorizing of hydrocarbon oils and also for use as catalysts and catalyst carriers. This type of structure is particularly well suited for use where the gel becomes contaminated with carbonaceous material and must be regenerated periodically by burning to remove the contaminant. On the other hand, gels of a fine pore structure are most suitable for such purposes as removing condensible vapors from gases, particularly where a high degree of removal of the condensible material is essential.

As indicated above, our present invention is directed toward improvements in titania gels and methods of preparing the same. We have developed a process for producing titania gels of a high degree of purity and for controlling the adsorptive power of such gels within the range corresponding to apparent densities of approximately 0.8 to 1.3 grams per cubic centimeter. The titania gels which we prepare have their principal use as supports for other catalysts. For example, as disclosed in a copending application, titania gels impregnated or combined with boron oxide have been found to be effective as catalysts for converting high boiling hydrocarbon oils in good yields to hydrocarbons boiling in the gasoline range and having excellent antiknock properties.

One object of our present invention, therefore, is the provision of titania gels of desired apparent densities and improved methods for preparing these gels.

Another object of our invention is to prepare titania gels having a hard, glassy, amorphous structure and being substantially free of impurities.

A more specific object of the present invention is the production of a titania gel having the properties heretofore recited and being in the form of granules which do not decrepitate in contact with water.

Figure 2:
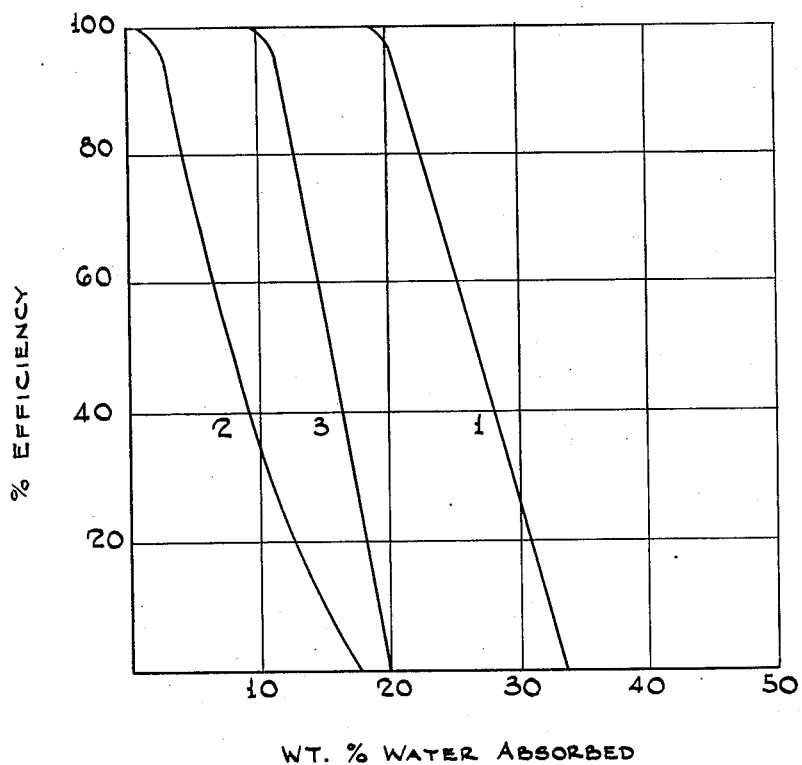

Additional objects of the present invention will be apparent from the following detailed description thereof in connection with the accompanying drawings, in which, Fig. 1 is a family of curves showing the relationship between the apparent density of titania gels and the pH of the solutions in which they are precipitated and the manner in which this relationship is affected by different steps in the preparation of the gels; and Fig. 2 is a family of curves showing the adsorptive capacity of titania gels produced by different methods.

The present invention constitutes an improvement over previous methods for preparing titania gels in that we have now discovered means for removing the impurities from the hydrogel so as to form the desired hard, glassy structure and at the same time to form pores of a predetermined size. The gels prepared according to prior methods could not be washed free of impurities which were adsorbed or occluded in the gel structure because of the ease with which the titania hydrogel was peptized by the washing operation to form a non-filterable, non-settling mass which could not be readily reformed to a gel structure. Furthermore, no method of regulating the pore size to a predetermined value was known.

The desirability of having pure gels cannot be overemphasized because with materials of the type with which this invention is concerned it is very essential that they have a long regenerative life, i. e., that they may be heated at relatively high temperatures many times with little if any decrease in efficiency. It is known that very small amounts of impurities may very seriously damage the adsorptive and catalytic efficiencies of these materials, particularly if the impurity is distributed throughout the gel as in a film. This deleterious effect is much greater than the proportion in which the impurity occurs in the gel and it cannot be explained by fusion of the impurity with the gel material. It seems more probable that the impurities have a catalytic effect in changing the gel structure from an amorphous to a crystalline form.

According to the present invention, titania gels of controlled pore size are produced by starting with titanyl sulphate, regulating the pH of the reaction solution in which the gel is precipitated within prescribed limits, washing the gel precipitated from the titanyl sulphate solution only to the point of incipient peptization, heating the washed gel at a temperature above the boiling point of water for a period between about 8 and 20 hours to remove water therefrom and rewashing the resulting gel until it is freed from impurities. We have found that, when titania gels are produced from titanyl sulphate, their pore size is a function of the pH of the solution in which they are formed, when they are prepared in accordance with the method of the present invention.

We have found, for example, that when the pH of the supernatant solution overlying the precipitated gel is on the acid side, gels having an apparent density greater than 1 are produced, while when the pH is on the alkaline side, gels having apparent densities ranging from about 0.8 to 1 are produced when the gels are prepared by the method of the present invention. By maintaining the pH of this solution at exactly 7, the titania gel produced by the method of the present invention has an apparent density of about 1. This apparent density rises sharply with a very slight shift of the pH to the acid side, reaching a density of about 1.3 at an acidity of 0.1 normal and thereafter levelling out as the acidity increases. In this range between the neutral point and an excess acidity of .01 N there is a straight line relationship between the apparent density of the gel produced and said excess acidity.

The apparent density decreases rather abruptly as the pH shifts to the alkaline side, reaching a density of between 0.8 and 0.9 at an alkalinity of 0.08 normal and thereafter levelling out with increased alkalinity. The exact minimum apparent density attained will depend on the purity of the titanyl sulphate employed as the starting material, the exact temperatures maintained for the different operations and the number of washes applied in the washing operations. In general, however, at any alkalinity in excess of about 0.04 normal, the manipulative steps of the present invention being followed, the apparent density will be below 0.9.

In referring to purity of the gels produced according to the present invention, the impurities considered are those which are water-soluble, such as ammonium sulphate where ammonia is used as the precipitating agent, as well as any excess titanyl sulphate. Commercial titanyl sulphate may contain small amounts of fixed impurities such as silica, alumina, and possibly zirconia. These impurities are usually quite small and, in the uses to which the titania gels are put, are comparatively inert and act as mere diluents. It is these impurities which sometimes prevent the attainment of the absolute lower limit of apparent density according to the present invention. Purity as referred to herein is purity by a test method, as, for example, the degree of cloudiness resulting from the addition of barium chloride solution to the wash water. Thus, when the wash water shows only a faint opalescence when treated with barium chloride solution, the gel is considered substantially pure for the purpose of the present invention.

In most uses to which the titania gels are put, it is preferable to use them in granular form. All titania gels, if merely dried, decrepitate badly with water, going in some cases to a very fine powder. This decrepitation renders very difficult the control of the particle size of the gel. According to the present invention, this property of decrepitation is minimized or entirely eliminated by subjecting the dried gel to a heating step prior to the final washing. Heating to 800° F. to 1000° F. for a period of at least three hours will substantially eliminate the tendency to decrepitate, while heating to 600° F. for a similar period will eliminate decrepitation to the extent of about 90%; that is, upon contact with water about 90% of the granules will retain their original size. In general, this heating step is practiced according to the present invention in order to provide better control of the final particle size which can be effected by grinding and classification without interference due to decrepitation.

For the production of gels of the desired properties, it is important that titanyl sulphate be employed as the starting material. Alkali metal titanates, when employed as the starting materials, even when processed according to the present invention, do not produce gels the apparent density of which has the same relation to the pH of the solution in which they are formed as that which characterizes the gels from the sulphate. Furthermore, it is practically impossible to extract the alkali metal compounds from the final gel to the extent necessary to make them heat-stable. Gels from titanium chloride are uniformly inferior to those made from the sulphate. Again, when the processing procedure of the present invention is applied to titanium chloride, the resulting gels do not exhibit that relationship between their apparent density and the pH of the solution in which they are formed which characterizes gels produced from the sulphate.

In the foregoing, reference has been made to washing the gel immediately after it is precipitated from the starting solution to the point of incipient peptization. It may be pointed out that the amount of washing which may be tolerated is different depending upon whether the pH of the solution in which gel is formed is on the acid or on the alkaline side. If the supernatant liquid is on the acid side, four or five washes can be tolerated before the point of incipient peptization is reached. Where, however, the supernatant liquid is on the alkaline side, it is usually impossible to exceed two washings before the point of incipient peptization is reached.

Referring to Fig. 1, curve 1 represents the variation in apparent density with the pH of the supernatant liquid from which the gel is precipitated when the operating procedure of the present invention is followed. To obtain the points on this curve, gels were prepared by mixing varying quantities of 1.2 N ammonium hydroxide and 1 N titanyl sulphate with vigorous agitation to produce gels having supernatant liquids of varying pH values. In each case, the gelatinous precipitate was washed until incipient peptization was started, the jelly dried by heating at about 215° F. overnight, then heated at about 600° F. for about three hours to minimize decrepitation and then washed until virtually free of $SO_4$ ions as evidenced by testing the wash water with a barium chloride solution, dried and reheated at 1000° F. for three hours preliminary to determining apparent density. It will be observed from this curve that when the supernatant liquid is exactly neutral the apparent density of the gel is 1. Between the neutral point and an acidity of .01 normal, there is an abrupt rise of the apparent density to about 1.3. This value is slightly exceeded with increasing acidity but shows a tendency to level off.

On the other hand, with excess alkalinity of slightly over 0.04, the apparent density of the gel drops to 0.9; and with increasing alkalinity, this apparent density goes down to just below 0.875, where it remains with increasing alkalinity. It will be remembered that the minimum apparent density attained in this case was peculiar to the particular titanyl sulphate used as the starting material.

Curve 2 shows the same relationship when the second washing step after the heat treatment at 600° F. is omitted. Here it will be observed that the resulting gel has its highest density when the supernatant liquid is exactly neutral, namely, about 1.375. Shifting to either the alkaline or acid side reduces the apparent density of the resulting gel, but it is clear that at all pH values the resulting gel has an apparent density well over 1.

Curve 3 shows the same relationship when, instead of the final washing after heating at 600° F., an attempt is made to purify the gel by heating at 1250° F. until the barium chloride test shows substantial purity. In this case, while much of the impurities contained in the gel represented by curve 2 have been removed, the apparent density has not been substantially improved; in fact, it is much less susceptible to change with pH of the supernatant liquid than is the gel represented by curve 2. It is postulated that the gel represented by curve 3 has a structure entirely different from that represented by curve 1, this difference being brought about by the high temperature treatment while the gel still contained sulphate radicals.

In Fig. 2 the family of curves shows the results of adsorption tests made with air saturated with water vapors at 25° C. on titania gels made while maintaining the same excess alkalinity (0.05N) in the precipitation step but handled differently subsequent to the drying step at 215° F. In these curves, ordinates represent per cent efficiency of adsorption and abscissae represent amount of water adsorbed in per cent by weight of the adsorbent. Thus, at the beginning the gel is 100% efficient until it adsorbs a certain percentage of its weight of water (in the case of gel #1, about 17.5%). As the passage of wet air continues the gel begins to drop in efficiency, letting some water through. Where the curve hits zero axis, the gel removes no water from the air, and the per cent by weight of water held by the gel at that point is its capacity.

The gel represented by curve 1 was heat treated at 600° F. for three hours and then rewashed to substantial purity according to the present invention. The gel represented by curve 2 was given the same treatment without the rewashing step. The gel represented by curve 3 was purified by heating at 1250° F. instead of by washing. It will be observed that the gel represented by curve 1 exhibited adsorbing powers considerably superior to the gels represented by curves 2 and 3. The adsorptive power shown by gel 1 is also superior to that exhibited by commercial adsorptives such as activated alumina. It closely approaches the adsorptive power of the best known adsorptive gels such as high grade silica gels and peptized type alumina gels.

In order more fully to illustrate our invention, the following specific examples are set forth:

*Example 1*

Equal volumes of 1.2 normal ammonium hydroxide and 1.0 normal titanyl sulphate solutions are mixed with vigorous stirring to form a highly voluminous jelly of titania. The supernatant liquid has an excess alkalinity of about 0.01 to 0.10 normal. The jelly is allowed to stand overnight after which it is washed by decantation until incipient peptization sets in. In the case of jellies formed in alkaline solution, one to two washings are usually all that can be tolerated before peptization begins. At this point the jelly is dried by which is meant the removal therefrom of disengageable water, preferably at a temperature above the boiling point of water. To avoid decrepitation, if the gel is desired in granular form, it is then further heated at a temperature of about 800° F. The dried gel is then further washed with water until substantially free of reaction products. This material when activated for three hours at 1000° F. with a particle size of 4-12 mesh will have an apparent density of between 1.00 and 0.80 grams per cubic centimeter.

*Example 2*

The same solutions used in Example 1 are mixed in such proportions that the supernatant liquid is acid, usually 0.001 to about 0.1 normal. The jelly is washed by decantation and it will be found in this case that it does not peptize so rapidly as the jelly formed in alkaline solutions. Usually five or more washings can be tolerated before peptization begins. The jelly is then dried, heated and rewashed as before. In this case the product will have an apparent density of about 1.0 to 1.3 grams per cubic centimeter.

*Example 3*

Equal volumes of 1.2 N ammonium hydroxide and 1 N titanyl sulphate solutions are mixed with vigorous stirring to form a highly voluminous jelly or titania. The supernatant liquid, after standing overnight, has an excess alkalinity of 0.05 N. The jelly is washed by decantation until incipient peptization sets in. One or two washings are usually all that can be tolerated. The jelly is filtered, as by vacuum or by pressure filtration. The cake is then broken up and dried by heating overnight, preferably at a temperature above the boiling point of water, such as 105° C. To avoid decrepitation, if the gel is desired in granular form, it is then further heat-treated for three hours at 600°–800° F., if the product is to be used for general adsorption purposes, or to 800°–1000° F., if it is to be used as a catalyst or catalyst carrier. The dried or heat-treated gel is then further washed with water until substantially free of reaction products, that is, until there is not more than a faint opalescence when the wash water is tested with a barium chloride solution. Next the material is activated for three hours at 600° F. or 1000° F. dependent on whether it is to be used for adsorption or catalytic purposes. The apparent densities of the 4 to 12 mesh granules will be about 0.86 and 0.89, respectively. The granules are hard and have a glassy appearance.

*Example 4*

The same solutions used in Example 1 are mixed in such proportions that the supernatant liquid is very slightly acid, 0.008 N. The jelly is washed by decantation and it will be found in this case that it does not peptize so readily as the jelly formed in alkaline solutions. Usually four or five washes can be tolerated before peptization begins. The jelly is then dried, heated to 800° F. and rewashed as before and until virtually free of sulphate ions. The 4 to 12 mesh granules, after an activation for 3 hours at 1000° F., will have an apparent density of 1.125. The granules are similar in appearance to those produced according to Example 3.

*Example 5*

By way of contrast, a titania gel was prepared by mixing 1.2 normal ammonium hydroxide and 1.0 normal titanium chloride in proportions such as to give a supernatant liquid over the precipitated jelly having an excess alkalinity of 0.05 normal. This gel was washed to the point of incipient peptization, dried by heating at 105° C. overnight, then heated to 600° F. for 3 hours followed by washing to substantial purity as indicated by the barium chloride test. Upon drying and heating for 3 hours at 1000° F., this gel in particle size of 4–12 mesh had an apparent density of 1.08 and was capable of absorbing only 23.9% by weight of water from air saturated at 25° C. as compared with almost 35% adsorbed by gel prepared in a similar manner from titanyl sulphate. A portion of this same gel, not rewashed after the heat treatment but heated at 1250° F. for about 6 hours to substantially the same purity, had an apparent density of 1.13 and adsorbed 18.9% of water from air saturated at 25° C. The gel from the chloride was not as heat stable as the gel from the sulphate.

The titania gels may be used in granular or powdered form or may be extruded, pilled or otherwise shaped. Also the partly purified jelly may be formed as by extrusion, preferably preceded by suitable mulling, then dried and rewashed as disclosed heretofore.

To recapitulate, our invention relates to improved titania gels and a method for preparing the same. More particularly, the present invention is directed toward preparing gels of desired apparent density and of the necessary purity. We accomplish these results by starting with titanyl sulphate, regulating the pH of the solution in which the jelly is formed, washing the jelly to incipient peptization, drying the jelly and then rewashing the dried gel with water to remove the products of reaction and obtain a gel of the desired purity.

This application is a continuation-in-part of our copending application Serial No. 426,178 filed January 9, 1942, now abandoned.

The term "apparent density," as used in the claims, denotes the weight in grams of one cubic centimeter of a gel having a particle size of from 4 to 12 mesh which has been heated for 3 hours at 1000° F.

We propose to claim as our invention the invention expressly described herein and all modifications thereof which are included by necessary implication except those excluded by the terms of the appended claims.

What we claim is:

1. A method for producing titania gel of selected apparent density which comprises precipitating titania in gel form from a solution of titanyl sulphate while adjusting the proportions of the reactants so as to maintain in the supernatant liquid resulting from the precipitation a pH selected to give the desired gel apparent density, being on the acid side for a desired apparent density above 1 and on the alkaline side for a desired apparent density less than 1, washing the precipitated gel to the point of incipient peptization, heating the gel to a temperature above the boiling point of water for several hours to remove water therefrom, further washing the gel until the gel is substantially free of water-soluble impurities and drying the gel by heating to a temperature within the range of about 600°–1000° F.

2. A method according to claim 1 in which the gel resulting from the water removal step is heated for at least 3 hours to a temperature between 600° F. and 1000° F. before the rewashing step.

3. A method for preparing a substantially pure titania gel having an apparent density from about 0.8 to 1.0 which comprises adding ammonium hydroxide to an aqueous solution of titanyl sulphate in an amount sufficient to precipitate titania gel and to impart to the supernatant liquid over the gel an excess alkalinity between about .01 and .10 normal, washing the gel until incipient peptization sets in, heating the gel to a temperature substantially above the boiling point of water for several hours to remove water from the gel, rewashing the gel until the gel is substantially free of water-soluble impurities and drying the purified gel.

4. A method according to claim 3 in which the gel resulting from the water removal step is heated for at least 3 hours to a temperature between 600° F. and 1000° F. before the rewashing step.

5. A method for preparing a substantially pure titania gel having an apparent density between about 1 and 1.3 which comprises adding ammonium hydroxide to an aqueous solution of titanyl sulphate in an amount sufficient to precipitate titania gel and provide in the supernatant liquid an excess acidity from .001 to .10 normal, the acidity maintained bearing the same ratio to .001 as the desired apparent density bears to 1, washing the precipitated gel until incipient peptization sets in, heating the washed gel at a temperature substantially above the boiling point of water for several hours to remove water therefrom, rewashing the gel until the gel is substantially free of water soluble impurities and drying the gel by heating to about 1000° F.

6. A method according to claim 5 in which the gel resulting from the water removal step is heated for at least 3 hours to a temperature between 600° F. and 1000° F. before the rewashing step.

7. In a method of preparing titania gel in which a gelatinous precipitate of titania is formed from a solution of a titanium compound of the group consisting of titanyl sulfate and titanium chloride and the precipitate is separated and dried at a temperature above the boiling point of water, the step of washing the dried precipitate until it is substantially free of water soluble impurities.

GERALD C. CONNOLLY.
ROBERT E. SCHEXNAILDER, Jr.

REFERENCES CITED

The following references are of record in the file of this patent:

UNITED STATES PATENTS

| Number | Name | Date |
|---|---|---|
| Re. 16,956 | Blumenfeld | May 8, 1928 |
| 1,682,242 | Patrick | Aug. 28, 1928 |
| 2,040,823 | Allan | May 19, 1936 |
| 2,143,850 | Allan | Jan. 17, 1939 |
| 2,280,650 | Kassel | Apr. 21, 1942 |